US012775078B2

(12) United States Patent
Dutton et al.

(10) Patent No.: US 12,775,078 B2
(45) Date of Patent: Oct. 27, 2026

(54) ToF WRAPAROUND MITIGATION AND EME REDUCTION

(71) Applicant: STMicroelectronics International N.V., Geneva (CH)

(72) Inventors: Neale Dutton, Edinburgh (GB); Pascal Mellot, Lans en Vercors (FR); Herve Thuaire, Saint Martin d'heres (FR); Kenneth Dargan, Edinburgh (GB)

(73) Assignee: STMicroelectronics International N.V., Geneva (CH)

(*) Notice: Subject to any disclaimer, the term of this patent is extended or adjusted under 35 U.S.C. 154(b) by 296 days.

(21) Appl. No.: 18/790,001

(22) Filed: Jul. 31, 2024

(65) Prior Publication Data

US 2026/0036684 A1 Feb. 5, 2026

(51) Int. Cl.

| | |
|---|---|
| ***G01S 7/487*** | (2006.01) |
| ***G01S 7/4865*** | (2020.01) |
| ***G01S 17/26*** | (2020.01) |

(52) U.S. Cl.

CPC .......... *G01S 7/4876* (2013.01); *G01S 7/4865* (2013.01); *G01S 17/26* (2020.01)

(58) Field of Classification Search

CPC ...... G01S 7/4876; G01S 7/4865; G01S 17/26; G01S 7/484

See application file for complete search history.

(56) References Cited

U.S. PATENT DOCUMENTS

| | | | | |
|---|---|---|---|---|
| 10,571,570 B1 * | 2/2020 | Paulsen | .................. | G01S 17/10 |
| 2006/0279461 A1 | 12/2006 | Zlmmerman | | |
| 2011/0285439 A1 | 11/2011 | Xiu | | |
| 2013/0222550 A1 | 8/2013 | Choi et al. | | |
| 2018/0068424 A1 | 3/2018 | Kwon et al. | | |
| 2018/0081033 A1 | 3/2018 | Demirtas et al. | | |
| 2018/0188368 A1 | 7/2018 | Zuffada et al. | | |
| 2019/0302244 A1 | 10/2019 | Egea | | |
| 2021/0004975 A1 | 1/2021 | Cohen | | |
| 2022/0128352 A1 | 4/2022 | Binder | | |

(Continued)

OTHER PUBLICATIONS

Girshick, Ross, "Object Detection with Heuristic Coarse-to-Fine Search," PhD Thesis. Chicago: University of Chicago, May 29, 2009, 67 pages.

(Continued)

*Primary Examiner* — Tony Ko

(74) *Attorney, Agent, or Firm* — Slater Matsil, LLP

(57) ABSTRACT

According to an embodiment, a method to mitigate target wraparound in time-of-flight is proposed. The method includes extending the system's pulse interval to include predetermined and dynamic blanking times. The dynamic blanking time is increased by an offset at each successive pulse. The dynamic blanking time is reset in response to reaching a predetermined dynamic blanking time. The dynamic blanking time is initially set to zero. The method further includes processing events within an active window to measure a time interval between the transmission of a pulse and the receipt of a reflected pulse from an object. The duration of the active window is equal to the duration of the initial pulse interval. The method further includes ignoring events within an inactive window, a duration of the inactive window corresponding to the duration of the extended pulse interval minus the duration of the active window.

20 Claims, 6 Drawing Sheets

(56) References Cited

U.S. PATENT DOCUMENTS

| | | | |
|---|---|---|---|
| 2023/0358865 | A1 | 11/2023 | Tachwali |
| 2024/0036173 | A1 | 2/2024 | Dutton |

OTHER PUBLICATIONS

Incoronato, Alfonso et al., "Statistical Modelling of SPADs for Time-of-Flight LiDAR," Sensors 2021, 21, 4481, Jun. 30, 2021, 23 pages.

Stmicroelectronics, "Going Further with Flightsense," Sensor test, 2020, 43 pages.

* cited by examiner

ToF WRAPAROUND MITIGATION AND EME REDUCTION

TECHNICAL FIELD

The present disclosure generally relates to electronic devices, and, in particular embodiments, to time-of-flight (ToF) wrap-around mitigation and electromagnetic emission reduction.

BACKGROUND

Generally, in Time of Flight (ToF) systems, the measuring technique involves transmitting an optical or radio signal and measuring the time it takes for the reflection to return from a target object. The distance to the target is deduced from this flight time. However, a problem afflicting these systems is the phenomenon known as "target wraparound." This problem arises when a reflective target is located at a distance that exceeds the unambiguous measurement range of the time-of-flight system. When this occurs, the reflected signal returns after initiating subsequent pulse emissions, causing a temporal overlap and consequent measurement error. As a result, the target can be inaccurately represented as being much closer in the processed data due to the reflected signal from the distant target being falsely interpreted as a near-range object (falsely aliased back to a value within the detectable range). This wraparound issue can degrade the performance of time-of-flight applications, leading to erroneous measurements and unreliable data.

In addition to issues with measurement accuracy, time-of-flight can suffer from electromagnetic compatibility (EMC). Electromagnetic emission (EME) is closely related to the repetition period of the laser pulses compared to the repetition period of the signal-processing chain, which is responsible for resolving detected photons into histogram bins. Switching the laser current involves rapid changes in current levels exhibiting substantial rise and fall times (high di/dt). This high-rate change in current can inadvertently act as a source of electromagnetic interference (EMI) to other components, such as the global positioning satellite (GPS) sensors, the communication network receivers, and cameras in consumer devices. The undesirable emissions can cause disruptions in both the time-of-flight system itself and other proximate electronic systems, potentially leading to performance degradation or failure.

SUMMARY

Technical advantages are generally achieved by embodiments of this disclosure, which describe time-of-flight (ToF) wrap-around mitigation and electromagnetic emission reduction.

A first aspect relates to a method to mitigate target wraparound in a time-of-flight system. The method includes extending a pulse interval of the time-of-flight system from a first pulse interval to a second pulse interval to include a predetermined blanking time; extending the second pulse interval of the time-of-flight system to a third pulse interval to include a dynamic blanking time, wherein the dynamic blanking time is increased by an offset at each successive pulse, wherein, in response to the dynamic blanking time reaching a predetermined dynamic blanking time, the dynamic blanking time is reset, and wherein the dynamic blanking time is initially set to zero; processing events by the time-of-flight system within an active window to measure a time interval between a transmission of a pulse and receipt of a reflected pulse from an object by the time-of-flight system, a duration of the active window equal to a duration of the first pulse interval; and ignoring events within an inactive window, a duration of the inactive window corresponding to a duration of the third pulse interval minus the duration of the active window.

A second aspect relates to a method to mitigate electromagnetic emissions in a time-of-flight system. The method comprising extending a pulse interval of the time-of-flight system from a first pulse interval to a second pulse interval to include a predetermined blanking time; extending the second pulse interval of the time-of-flight system to a third pulse interval to include a dynamic blanking time, wherein the dynamic blanking time is increased by an offset at each successive pulse, wherein, in response to the dynamic blanking time reaching a predetermined dynamic blanking time, the dynamic blanking time is reset, and wherein the dynamic blanking time is initially set to zero; employing a spread spectrum frequency modulation to a clock signal used for timing of pulses at each pulse interval; processing events by the time-of-flight system within an active window to measure a time interval between a transmission of a pulse and receipt of a reflected pulse from an object by the time-of-flight system, a duration of the active window equal to a duration of the first pulse interval; and ignoring events within an inactive window, a duration of the inactive window corresponding to a duration of the third pulse interval minus the duration of the active window.

A third aspect relates to a time-of-flight system, comprising a non-transitory memory storage comprising instructions; and a processor in communication with the non-transitory memory storage, wherein the instructions, when executed by the processor, cause the time-of-flight system to: extend a pulse interval of the time-of-flight system from a first pulse interval to a second pulse interval to include a predetermined blanking time, extend the second pulse interval of the time-of-flight system to a third pulse interval to include a dynamic blanking time, wherein the dynamic blanking time is increased by an offset at each successive pulse, wherein, in response to the dynamic blanking time reaching a predetermined dynamic blanking time, the dynamic blanking time is reset, and wherein the dynamic blanking time is initially set to zero, employ a spread spectrum frequency modulation to a clock signal used for timing of pulses at each pulse interval, and process events by the time-of-flight system within an active window to measure a time interval between a transmission of a pulse and receipt of a reflected pulse from an object by the time-of-flight system, a duration of the active window equal to a duration of the first pulse interval, wherein events within an inactive window are ignored, a duration of the inactive window corresponding to a duration of the third pulse interval minus the duration of the active window.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
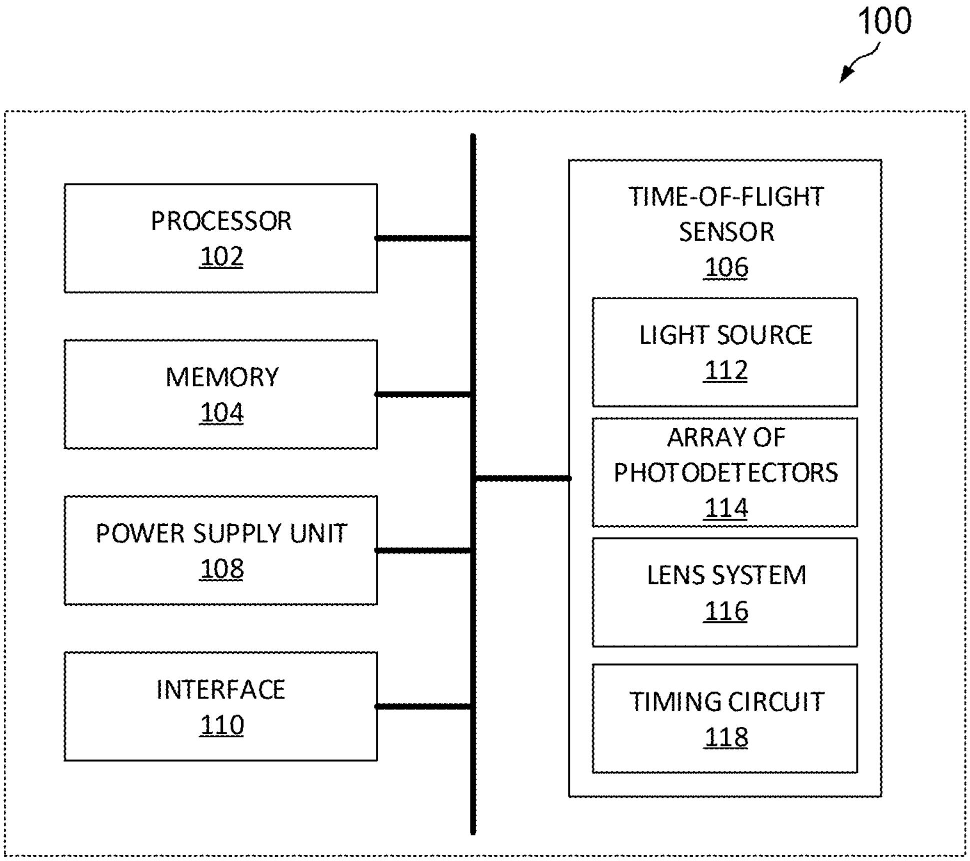
FIG. 1 is a block diagram of an embodiment system.

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of a time-of-flight system, it should also be appreciated that these inventive aspects may also apply to other applications such as light detection and ranging (LiDAR) applications, indirect time-of-flight systems, and single-zone time-of-flight systems in laser autofocus (LAF) applications. In particular, aspects of this disclosure may similarly apply to consumer and commercial applications such as three-dimensional cameras, augmented reality (AR), or virtual reality (VR) applications. For example, although the inventive aspects are directed to a time-of-flight system, embodiments of the disclosure can apply to a radar or camera-based system.

Aspects of the disclosure address electromagnetic emissions and target wraparound issues using timing adjustments in laser shot timing. In embodiments, a fixed blanking time (i.e., static blanking) is introduced between laser shots, creating a "dead zone" where distant targets that fall beyond the system's range are ignored, which not only helps to mitigate target wraparound by preventing false close-range detections but also alters and shifts the fundamental frequency and related harmonic tones, contributing to reduced electromagnetic emissions.

In embodiments, a dynamic blanking time is incorporated into the time-of-flight system, introducing variability in the "dead zone." This approach spreads the histogram peak of targets within this variable range, making them resemble ambient noise or appear as wider targets, which helps diffuse potential wraparound errors. Additionally, dynamic blanking fragments each electromagnetic tone into several finer tones correlated to the offsets, dispersing the electromagnetic signature and reducing peak emissions.

A "PLL spread-spectrum" technique with dynamic blanking time is provided in embodiments. This method modulates the clock used by the time-of-flight system for exposure by applying a spread-spectrum methodology. In embodiments, the PLL spread spectrum technique, in combination with the dynamic blanking time, results in the electromagnetic tones being spread across the frequency spectrum, offering an approach to reducing electromagnetic emissions by enhancing frequency distribution and minimizing the likelihood of interference with other systems. While not significantly affecting target wraparound issues (operates like dynamic blanking time), the spread-spectrum feature increases the standard deviation of the frequency without majorly impacting target detection. These and further details are provided below.

FIG. 1 illustrates a block diagram of an embodiment system 100. System 100 includes a processor 102, a memory 104, a time-of-flight (ToF) sensor 106, a power supply unit (PSU) 108, and an interface 110, which may (or may not) be arranged as shown. Although one of each (i.e., the processor 102, the memory 104, the ToF sensor 106, the power supply unit 108, and the interface 110) is shown in FIG. 1, the number of components is not limiting, and greater numbers are similarly contemplated in other embodiments.

System 100 may include additional components not depicted, such as long-term storage (e.g., non-volatile memory, etc.), power management circuitry, security and encryption modules (e.g., trusted platform modules (TPM), etc.), a global positioning satellite (GPS) sensor, transmitters, receivers, cameras, or the like. System 100 may be an electronic device, such as a smartphone, a tablet, a laptop, a smartwatch, a vehicle, or any system or sub-system capable of hosting the ToF sensor 106.

In embodiments, each component can communicate with any other component internally within or external to the system 100. For example, each component can communicate using the I2C (Inter-Integrated Circuit), alternatively known as I2C or IIC, communication protocol, the I3C (Improved Inter Integrated Circuit) communication protocol, the serial peripheral interface (SPI) specification, or the like.

Processor 102 may be any component or collection of components adapted to perform computations or other processing-related tasks. In embodiments, processor 102 is an application processor, a baseband processor, or a microcontroller.

Memory 104 may be any component or collection of components adapted to store programming or instructions for execution by processor 102. In an embodiment, memory 104 includes a non-transitory computer-readable medium.

ToF sensor 106 measures the distance between it and objects in its field of view by utilizing the speed of light. ToF sensor 106 emits a light signal, which travels to the target object, reflects off it, and then is captured back by the ToF sensor 106. The time taken for this round trip is measured—and because the speed of light is constant, the distance to the object can be calculated accurately by the ToF sensor 106 using this time measurement.

ToF sensor 106 includes a light source 112, typically an infrared (IR) LED, a laser diode, or a vertical-cavity surface-emitting laser (VCSEL). The light source 112 emits a light signal towards an object to be measured. In embodiments, ToF sensor 106 uses a continuous wave of light (i.e., indirect time-of-flight (iToF)). In embodiments, ToF sensor 106 uses pulsed light signals (i.e., direct time-of-flight (dToF) applications).

On the receiving end of the signal is an array of photodetectors 114 sensitive to the specific wavelength of the emitted light. ToF sensor 106 may include a lens system 116 to focus the emitted light into a beam and ensure that reflected light is directed onto the array of photodetectors 114. In embodiments, the array of photodetectors 114 is a Single-Photon Avalanche Diode (SPAD) detection array. ToF sensor 106 may include additional components not shown, such as memory, a microcontroller, and a VCSEL driver.

ToF sensor 106 may include a timing circuit 118 for accurately measuring the interval between when the light is emitted and when it is detected after reflection. In embodiments, timing circuit 118, in concert with the processor 102, provides the signals to operate the ToF sensor 106 (e.g., transmission of the light signal and reception of the reflected light signal).

In embodiments, processor 102 receives data from the ToF sensor 106, interprets the timing data, and converts it into distance measurements. The processor 102 may apply algorithms to refine the data, compensating for factors like ambient light noise or object reflectivity variations to provide more reliable distance information. ToF sensor 106 may be a multi-zone ToF sensor that can measure distances in several separate zones, such as 4×4, 8×8, or 16×16 zones.

In embodiments, ToF sensor 106 includes a dedicated processor embedded within. In embodiments, the dedicated processor embedded within the ToF sensor 106 performs some or the entirety of the algorithms generally stated to be executed by processor 102 in the present disclosure. For brevity, the internal processor of the ToF sensor 106 is not detailed.

Power supply unit 108 may be any component or collection of components that provide power to one or more components within the system 100. Power supply unit 108 may include various power management circuitry, charge storage components (i.e., battery), and the like.

Interface 110 may be any component or collection of components that allow processor 102 to communicate with other devices/components or a user. For example, interface 110 may be adapted to allow a user or ToF sensor 106 to interact/communicate with the system 100.

ToF has revolutionized distance measurement and imaging, but it has limitations. One problem is the occurrence of the "wraparound" effect. For example, consider that ToF sensor 106 has a maximum operational range of 10 meters. When ToF sensor 106 encounters two objects, the first placed at a distance of 2 meters and the second at 6 meters, it constructs a time-domain histogram that correctly identifies and reflects the distances of both targets since both distances fall within the sensor's range.

However, the scenario changes should ToF sensor 106 possess a constrained range of just 5 meters. The first target at 2 meters is still accurately depicted on the histogram at its distance. Even though positioned at 6 meters, the second target becomes a victim of measurement aliasing due to the wraparound effect. As the range of the ToF sensor 106 cannot encompass the true distance to the second target (which exceeds the 5-meter range), the histogram interprets the signal as if the target has looped back within its measurable domain. Thus, the additional 1 meter beyond the 5-meter range erroneously appears as if the target is at 1 meter. This misrepresentation is essentially the result of subtracting the maximum range (5 meters) of the ToF sensor 106 from the actual distance of the second target (6 meters). This artifact compromises the accuracy of distance measurements.

Further, the rapid switching of currents for generating measurement pulses at the ToF sensor 106 results in the manifestation of harmonics (i.e., multiples of the fundamental frequency of the signal, which arise due to the non-linear behavior of electronic components when subjected to high-speed transitions or changes—in this case, the switching current of the light source 112). With the rise and fall times of the current being exceedingly short (i.e., high di/dt), the current waveform deviates from a pure sine wave with sharp edges or abrupt changes. As a periodic waveform can be represented as the sum of a series of sine waves, each corresponding to a fundamental frequency and its harmonics, the steeper the transitions in the waveform, the richer the content of high-order harmonics. These harmonics extend into high-frequency bands and can interfere with other electronic components within system 100 through radiated or conducted paths.

Generally, the laser pulse's repetition period influences a device's electromagnetic emissions. For example, devices using vertical-cavity surface-emitting lasers (VCSELs) experience sharp changes in current when the current is switched on and off. Such sudden changes create a condition where the conducting wire acts as an antenna, emitting energy into the surrounding environment. This event occurs at the current pulse's leading and trailing edges.

For example, with a repetitive pattern approximately every 100 nanoseconds, a fundamental frequency of 10 megahertz is established, characteristic of a square wave with a fast-rising edge. The nature of this waveform, with its swift transitions, generates harmonics beyond the fundamental frequency. The resulting electromagnetic emission can cause malfunctions in sensitive components due to signal corruption, produce false measurements, or create interference that disrupts adjacent electronic systems and communication channels. Moreover, these emissions can lead to non-compliance with electromagnetic compatibility requirements.

Conventional solutions to address the target wraparound issue involve interleaved timings and complex algorithms. For example, by employing two distinct exposure periods for capturing the target reflections—example A with a timing period of 52 nanoseconds and example B with a slightly longer period of 56 nanoseconds, targets present in the overlapping field of view are captured at different timings. Algorithms then process these datasets to discern consistent target reflections across both exposures A and B and to identify targets whose apparent positions shift due to the change in timing intervals. This approach enables system 100 to differentiate between legitimate near-field targets and those that appear closer due to wraparound from beyond the maximum range of the ToF sensor 106. System 100 is rapidly switching between two frequencies, and by comparing the separate histograms generated, it can determine if a target's recorded position is an artifact of range aliasing. Targets that have shifted are recognized as being beyond the effective range and can be excluded from the final data through computational analysis.

However, this method has a scalability drawback when, for example, implemented in a system 100 with high-resolution sensor arrays, such as 8×8 or 16×16 single-photon avalanche diode (SPAD) arrays. The computational load for processing multiple timing channels for large arrays can be substantial, leading to increased complexity and power consumption, which might not be sustainable for all applications, especially those with stringent power or processing capabilities. Further, implementing the interleaved timing adds an alternate set of harmonics switching at the frame rate, exasperating the electromagnetic emission issues in system 100.

Conventional approaches to reduce electromagnetic emissions in electronic devices commonly employ a phase-locked loop (PLL) technique with spread spectrum frequency modulation in conjunction with a Spread Spectrum Clock Generation (SSCG) circuit. The SSCG circuit dynamically modulates the PLL clock's divider value, varying it incrementally around a central divider setting. Consequently, the resulting frequency of the clock is not fixed but "dithers" around the central value—sometimes slightly higher, sometimes lower.

For example, instead of emitting a single concentrated frequency, such as a precise 10 MHz clock signal, this method disperses the clock frequency over a range. For instance, it might alternate between 10.2 MHz and 9.6 MHz frequencies. The effect of this spread spectrum is to distribute the electromagnetic emission energy across a wider frequency band, thus reducing the intensity of emissions at any single frequency and slightly lowering the overall center frequency of emission. This process decreases potential interference and conforms to an emission profile with fewer peaks.

Despite its efficacy in lowering electromagnetic emission power, this strategy often comes with a trade-off in system performance. The modulation can increase the standard deviation of the system's timing signals, diminishing its overall accuracy. To combat this shortcoming, a solution involving limited FM depth can be applied, wherein the extent of frequency modulation is contained within a narrow range to minimize timing jitter. While this adjustment can preserve system accuracy, it inherently adds to the complexity of system 100. Further, while effectively reducing electromagnetic emissions, frequency modulation introduces additional errors in time-of-flight measurements. Excessive frequency modulation can lead to inaccuracies that compromise the precision of system 100. Consequently, this modulation must be carried out with restraint.

In light detection and ranging (LiDAR) applications, a strategy to mitigate electromagnetic emissions and target wraparound involves implementing pseudo-random blanking time (i.e., random dynamic blanking). This technique inserts a stepped blanking time, varied according to a pseudo-random pattern, into the intervals between laser pulses. The aim is to create non-repetitive firing times, thereby reducing the interference with other LiDAR systems and minimizing the occurrence of false targets. The random dynamic blanking in the timing results in a sequence-dependent, shaped frequency modulation that is inherently variant due to its pseudo-random nature.

However, this solution is not without limitations. It necessitates the inclusion of a programmable pseudo-random number generator within system 100, which introduces greater complexity and consumption of silicon real estate. This generator needs to function at the high clock rates intrinsic to system 100, typically on the order of gigahertz, which requires the adoption of fast-operating circuits. Moreover, as each device's frequency modulation is dictated by a unique pseudo-random sequence, the emitted frequency pattern will vary across devices. This variability poses a challenge in predicting the precise impact of electromagnetic emissions for each unit, complicating the process of ensuring consistent emissions control across all devices manufactured.

Accordingly, mitigating time-of-flight wraparound and reducing electromagnetic emissions in time-of-flight systems would be advantageous.

Figure 2:
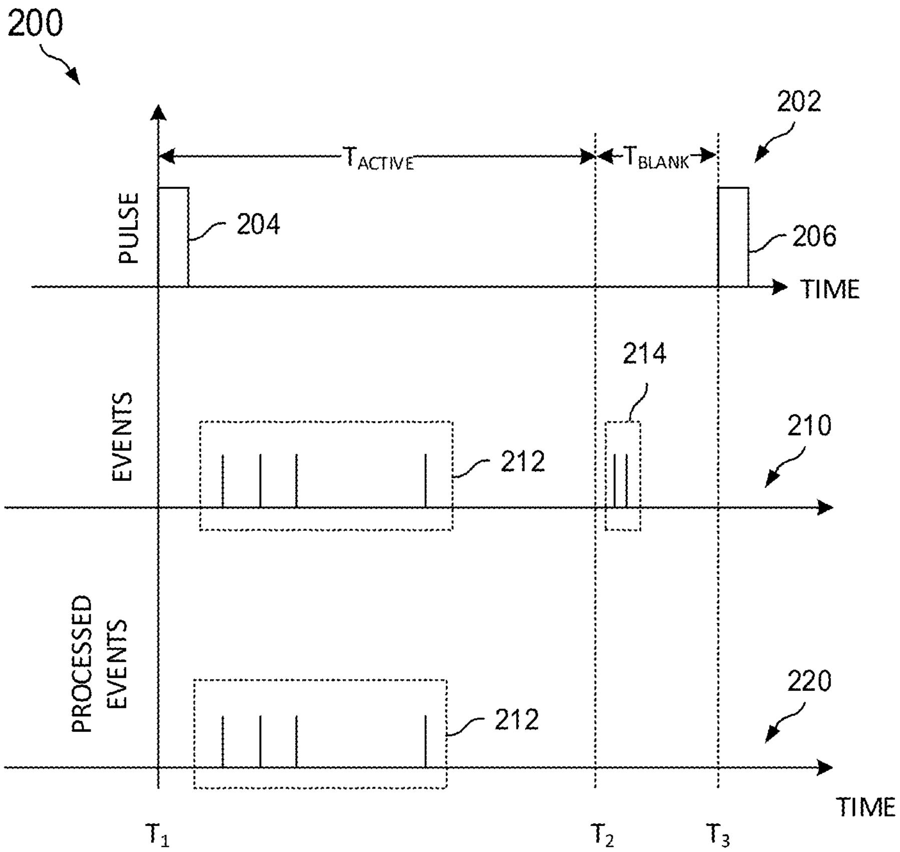
FIG. 2 is an embodiment timing diagram for a fixed blanking time strategy.

FIG. 2 illustrates an embodiment timing diagram 200 for a fixed blanking time strategy, which may be implemented, for example, in system 100. A fixed blanking time creates a "dead zone," and targets within this out-of-range dead zone are undetected by system 100, providing a mitigation strategy related to target wraparound. Further, the fixed blanking time can modify and adjust the fundamental frequency and harmonic tones, which helps manage electromagnetic emissions.

Ordinarily, the length of the pulse interval (i.e., inter-pulse period) between each successive pulse transmission is set based on the maximum range to which the ToF sensor 106 is expected to measure to prevent overlap and ensure accurate measurement without range ambiguity. The pulse interval is set to be long enough for the pulse to have sufficient time to travel to the target and back before the next pulse is transmitted.

Pulse interval 202 illustrates the transmission of pulses by the light source 112. At time $T_1$, a first pulse 204 (e.g., a burst of laser light) is emitted from the light source 112. At time $T_3$, a second pulse 206 is emitted from the light source 112. Normally, the time interval ($T_{ACTIVE}$) for a light pulse to travel from ToF sensor 106 to a target at the sensor's furthest measurable distance and then return to the ToF sensor 106 is the difference between time $T_2$ and time $T_1$ (i.e., $T_{ACTIVE}=T_2-T_1$). Here, the pulse interval ($T_{ACTIVE}+T_{BLANK}$) is extended by adding a predetermined blanking time ($T_{BLANK}$). Accordingly, the extended pulse interval is from time $T_1$ to time $T_3$.

Each pulse transmitted by the ToF sensor 106 propagates through space until it encounters an object. Upon striking the object, the pulse is reflected back toward the ToF sensor 106. The photodetectors 114 are positioned to capture this reflected light. When a pulse returns, its arrival is registered by the photodetectors 114 as a change in light intensity or a specific photonic signal. The processor 102, with data from the timing circuit 118, measures the time interval between the initial transmission of the pulse and the receipt of the reflected pulse by the photodetectors 114. This measured time (i.e., time of flight) is used to calculate the distance to the object based on the known speed of light.

Timing diagram 210 illustrates the sampling of events registered by the photodetectors 114 for the extended pulse interval ($T_{ACTIVE}+T_{BLANK}$) into a histogram. Between time $T_2$ and Time $T_1$, a first set of events 212 are registered by the photodetectors 114. Between time $T_3$ and Time $T_2$, a second set of events 214 are registered by the photodetectors 114.

Timing diagram 220 illustrates the sampling of events registered by the photodetectors 114 to be processed by the ToF sensor 106 into a histogram. The first set of events 212 (between time $T_2$ and time $T_1$) are processed by the ToF sensor 106 within the active window, and the second set of events 214 (between time $T_3$ and Time $T_2$) are ignored by the ToF sensor 106 during an inactive window. Accordingly, by integrating the predetermined blanking time ($T_{BLANK}$) in the pulse interval, a dead period (between time $T_3$ and Time $T_2$) is introduced during which the ToF sensor 106 ignores (e.g., suppresses) events registered by the photodetectors 114. In embodiments, the photodetectors 114 are configured not to register or collect events during the inactive window between time $T_3$ and time $T_2$.

The intentional suppression of registered events by the photodetectors 114 (or configuring the photodetectors 114 not to capture or register events) during the inactive window creates a dead zone that ensures targets beyond the measurement range of the ToF sensor 106 are not falsely detected. As a result, any targets existing within this dead zone are not registered by the system 100, thereby mitigating the issue of target wraparound, where distant objects could otherwise appear erroneously within range. By integrating the predetermined blanking time ($T_{BLANK}$) in the pulse interval, targets that are out of range of the ToF sensor 106 disappear from the ToF measurements. Accordingly, the proposed technique eliminates additional computational processing to resolve wraparound issues.

Further, integrating the predetermined blanking time ($T_{BLANK}$) in the pulse interval advantageously reduces electromagnetic emissions. The proposed integration facilitates a precise regulation of harmonic frequencies by allowing for the temporal modulation of the blanking period independent of other electromagnetic sources, such as the charge pump (CP) emissions. Adjusting the blanking time makes it possible to precisely manage the fundamental frequency and its corresponding harmonic tones. This allows a mechanism to reduce electromagnetic interference unaffected by other system components emitting electromagnetic emissions.

Altering the pulse interval directly impacts the frequency of the emitted pulses. For instance, if the original fundamental frequency of a pulse is set to 10 megahertz, adding the blanking time would consequently lower this frequency, causing a shift in harmonic tones associated with it. The control over the active window can be advantageous, especially when measured in small units like nanoseconds, sub-nanoseconds, or even hundreds of picoseconds. With control precision as fine as 250 picoseconds-equivalent to a segment of frequency adjustment at four gigahertz-a minor tweak can affect signal timing. This capability permits exceptional fine-tuning down to decimal places for the 10 MHz signal.

Utilizing this high-resolution control, it is possible to reposition a problematic harmonic frequency, shifting it by mere nanoseconds or even 250 picoseconds as required. Such minute adjustments can successfully relocate a harmonic from a problematic frequency band. The tone's harmonics can be manipulated without impacting any other blocks or elements within the system, giving a granular level of tuning that selectively affects the desired frequencies.

In embodiments, the length of the inactive window is configurable and adjustable (through system tuning) based on the application in which system 100 is deployed. Extending the predetermined blanking time reduces the number of pulses emitted during a given exposure period. This reduction in pulse count reduces the signal captured during the integration time—the period over which the sensor accumulates incoming light to form an image or a signal for measurement. As a result, there is a tradeoff to consider. While increasing the blanking time can help mitigate certain measurement errors, such as those caused by wraparound, it also decreases the signal-to-noise ratio (SNR) by lessening the useful signal data available for processing. Accordingly, manufacturers can balance minimizing errors and maintaining an adequate signal for accurate measurements by configuring the inactive window's length.

Figure 4:
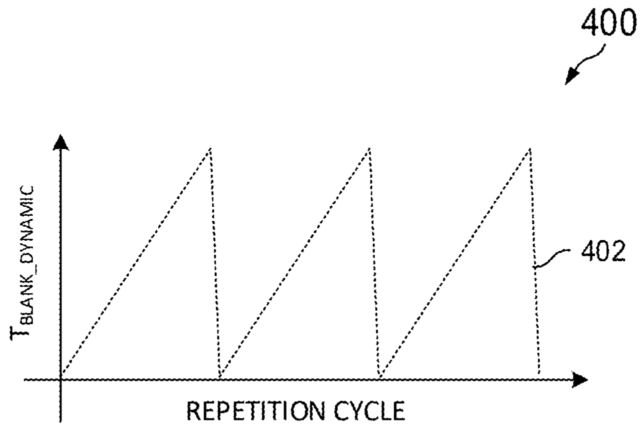
FIG. 4 is an embodiment timing diagram.
Figure 3:
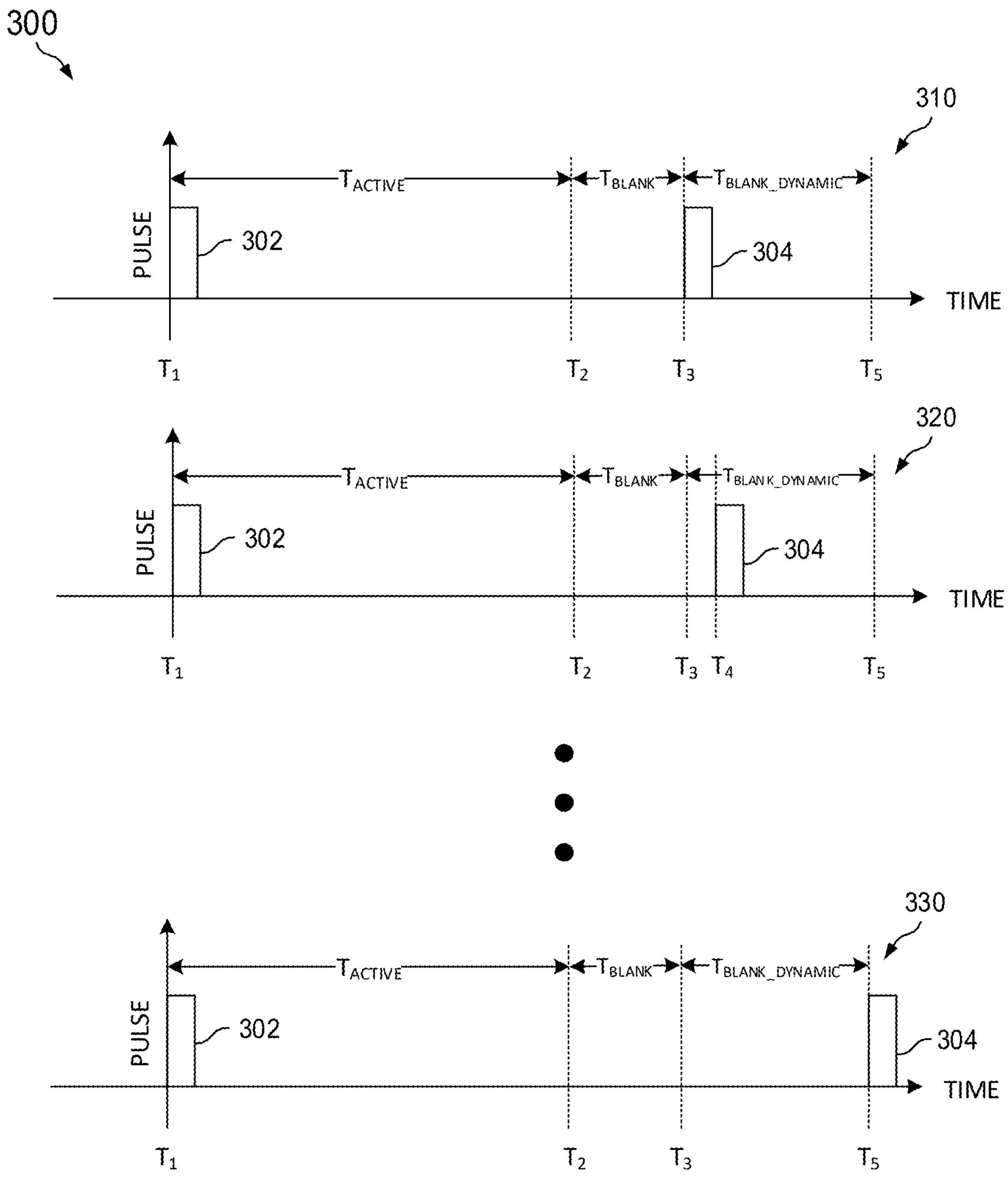
FIG. 3 is an embodiment timing diagram for a combined fixed and dynamic blanking time strategy.

FIG. 3 illustrates an embodiment timing diagram 300 for a combined fixed and dynamic blanking time strategy, which may be implemented, for example, in system 100. FIG. 4 illustrates an embodiment timing diagram 400, which may be implemented as the dynamic blanking time in FIG. 3.

Each pulse interval (310, 320, 330) is defined by an original pulse duration ($T_{ACTIVE}$) followed by a predetermined blanking period ($T_{BLANK}$) and a stepped dynamic blanking time ($T_{BLANK\_DYNAMIC}$). The stepped dynamic blanking time (i.e., variable time offset) is incrementally increased from 0 to a predefined limit, determined by a set number (N) of offsets (i.e., predefined limit=(N−1)×offset value). The embodiment depicted in FIG. 4 presents this stepped dynamic blanking time as forming a triangular dynamic pattern over time. This incrementally increasing dynamic blanking time results in a square-shaped frequency modulation signal.

It should be noted that although FIG. 4 illustrates a linear increase in the dynamic blanking time by a set offset value, it should be appreciated that in some embodiments, the dynamic blanking time may be increased by a pre-determined set of offsets that are not equal in value. Further, it should be appreciated that, in embodiments, dynamic blanking can be implemented using a dithering technique, akin to that used in signal processing applications.

The first pulse interval 310 is similar to the pulse interval 202 in FIG. 2, equal to the summation of the original pulse duration and the fixed blank predetermined blanking time—the dynamic blanking starts at zero, implying that if the original pulse duration is 64 nanoseconds and the predetermined blanking period is 16 nanoseconds, then the total pulse interval for the first pulse interval 310 would be 80 nanoseconds.

With each subsequent pulse, the dynamic blanking increases by one offset value, for instance, 1 nanosecond, leading to an 81-nanosecond total pulse interval for the second pulse interval 320.

The linear increment of the pulse interval continues until the $N^{th}$ pulse interval 330 where the total pulse interval equals the summation of the original pulse duration, the fixed predetermined blanking time, and the dynamic blanking (i.e., (N−1)×(OFFSET VALUE)).

For example, continuing with the previous example, if N equals 20 and the offset value is 1 nanosecond, the total pulse interval for the $N^{th}$ pulse interval 330 equals 99 nanoseconds. After the $N^{th}$ pulse interval 330, the dynamic blanking is reset to zero, and the sequence repeats.

Accordingly, the successive interval pulses—increased by the offset value at each interval pulse—introduce a variable "dead zone." The light reflected from the targets based on the proposed exposure sequence creates a spread histogram peak within the dead zone due to the dynamic blanking. This effect causes the targets to blend into the ambient noise or appear as elongated targets. Accordingly, by spreading their signal energy, dynamic blanking modifies the histogram peaks of out-of-range targets-those in the next period due to the distance in time of flight.

The added dynamic blanking addresses targets outside the main range of the original pulse duration in both time and frequency domains. The applied dynamic blanking effectively flattens and spreads out any reflected signal that could generate secondary peaks due to range wrapping. Consequently, even reflective targets, such as mirrors beyond the set blanking range, do not present discernible detections; instead, they merge into what appears as general ambient light because of the distributive action of the dynamic blanking process.

Moreover, the sequence of variable interval pulses advantageously reduces electromagnetic emissions. The dynamic blanking sequence fractionates each electromagnetic tone into smaller fractional tones distributed across proportional frequencies corresponding to each offset value. This approach mitigates electromagnetic interference by diffusing the energy over a broader range of frequencies instead of concentrating it at a single tone.

In contrast to the conventional solution, where the dynamic blanking is pseudo-random and complex, embodiments of this disclosure propose a simple, predictable, and linear dynamic blanking strategy, resulting in a reduction in computational overhead, scalability, and a smaller footprint.

Figure 5:
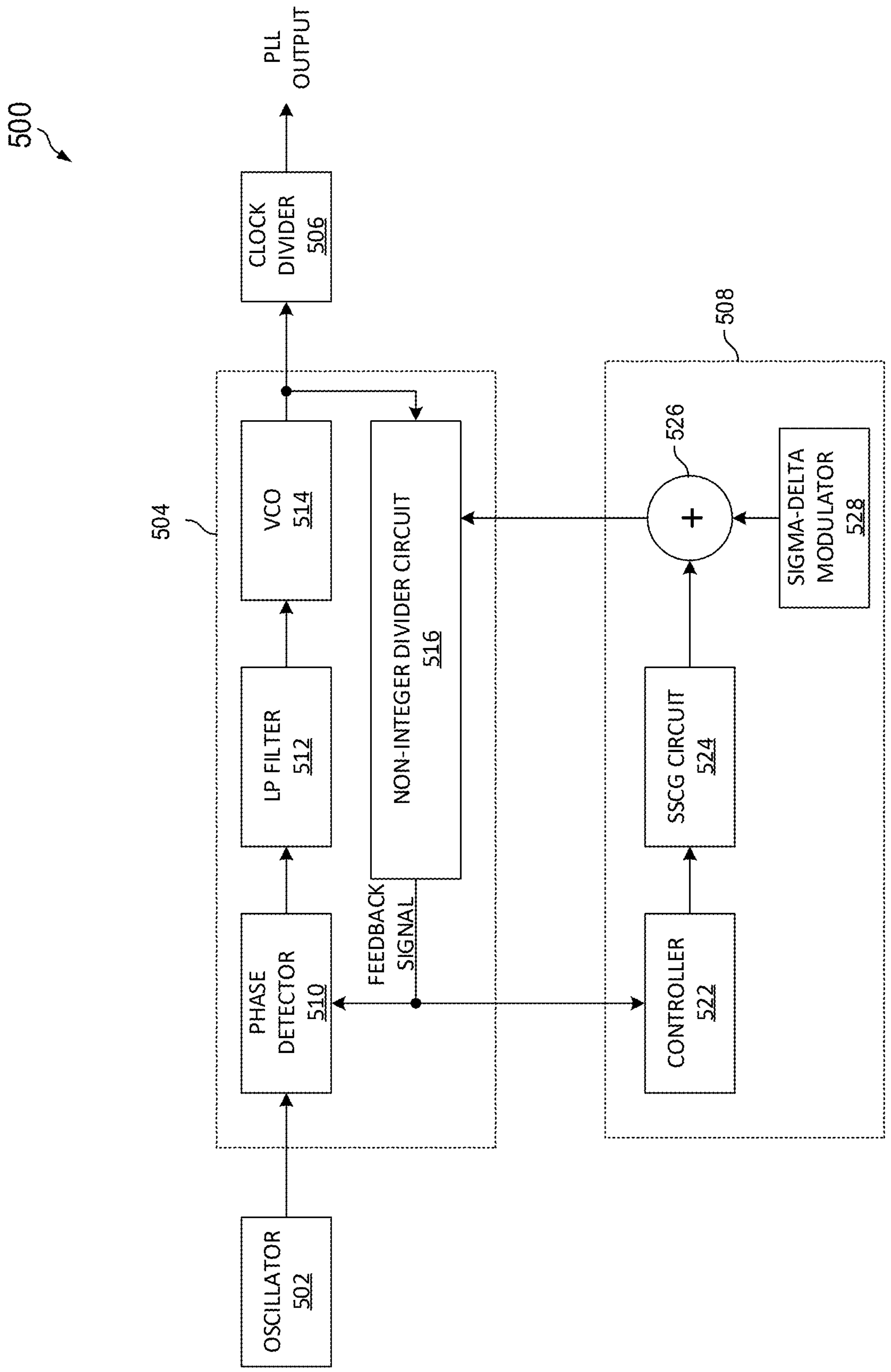
FIG. 5 is an embodiment phase-locked loop (PLL)

FIG. 5 illustrates an embodiment phase-locked loop (PLL) 500, which may be implemented in processor 102 or the timing circuit 118 of system 100. The phase-locked loop 500 is configured to synthesize a clock signal that employs frequency modulation to disperse the tone of electromagnetic emissions across the frequency spectrum. In embodiments, system 100 utilizes this modulated frequency from the phase-locked loop 500 in sync with the fixed blanking time and the dynamic blanking, as disclosed in FIG. 3, which collectively aid in reducing electromagnetic emissions.

Phase-locked loop 500 includes an oscillator 502, a PLL core 504, a clock divider 506, and a divider controller circuit 508, which may (or may not) be arranged as shown. Phase-locked loop 500 may include additional components not shown, such as additional filtering circuits or controllers.

Oscillator 502 is configured as an initial frequency source within the phase-locked loop 500 to generate a primary frequency signal fed into the PLL core 504. In embodiments, oscillator 502 is configured to produce the primary frequency signal with frequencies ranging, for example, from 8 to 16 MHz.

The PLL core 504 includes a phase detector 510, a low-pass filter 512, a voltage-controlled oscillator (VCO) 514, and a non-integer (i.e., fractional) divider circuit 516, which may (or may not) be arranged as shown. PLL core 504 may include additional components not shown.

Phase detector 510 interacts with the primary frequency signal from oscillator 502 and a feedback loop signal from the non-integer divider circuit 516 to calibrate the signal frequency at the output of the phase-locked loop 500.

The output signal from the phase detector 510 is fed to the low-pass filter 512, which is configured to eliminate higher-frequency components of the signal. This yields a stable filtered signal for the voltage-controlled oscillator 514, which is configured to generate a corresponding oscillating voltage based on the filtered signal from the low-pass filter 512.

The output of the voltage-controlled oscillator 514 is coupled to the non-integer divider circuit 516 and the clock divider 506. The non-integer divider circuit 516 is adept at fine-tuning the frequency, producing outputs with minimal deviations. In tandem, the phase detector 510 utilizes the feedback signal from the non-integer divider circuit 516 to modulate its output signal. This feedback signal is simultaneously relayed to the divider controller circuit 508. The divider controller circuit 508 is configured to adjust the non-integer divider circuit 516 based on the feedback signal to fine-tune the output frequency of the phase-locked loop 500.

Divider controller circuit 508 includes a controller 522, a spread spectrum clock generator (SSCG) circuit 524, an adder 526, and a sigma-delta modulator 528, which may (or may not) be arranged as shown. Divider controller circuit 508 may include additional components that are not shown. The feedback signal indicates the current output frequency of the phase-locked loop 500 and is used by the divider controller circuit 508 to modulate the frequency in a controlled manner.

Controller 522 receives the feedback signal from the non-integer divider circuit 516 and, in concert with the SSCG circuit 524, the adder 526, and the sigma-delta modulator 528, fine-tunes the output frequency of the phase-locked loop 500 to reduce electromagnetic interference.

Controller 522 processes the feedback signal and provides a modulation control signal to the SSCG circuit 524. SSCG circuit 524 generates a clock signal with a frequency modulated over time according to the control signal from controller 522. This spreads the energy of the clock signal across a broader spectrum.

Simultaneously, the sigma-delta modulator 528 operates to create a high-resolution control signal. It outputs a signal that can finely adjust the output frequency of the phase-locked loop 500 by introducing small, controlled variations around a target frequency based on its least significant bit (LSB) resolution. This contributes to a precision manipulation of the output frequency, contributing to a more finely tuned adjustment that complements the spreading effect created by the SSCG circuit 524. In embodiments, the LSB of the sigma-delta modulator 528 is +/−3.

The adder 526 receives the finely tuned control signal from the sigma-delta modulator 528 and the modulated clock signal from the SSCG circuit 524. Adder 526 combines these two inputs to generate a composite signal that encapsulates the high-resolution adjustments and the broader frequency spread.

This composite signal from adder 526 is fed back into the non-integer divider circuit 516. The composite signal influences the division ratio applied to the output of the voltage-controlled oscillator 514, effectively incorporating fine-tuning adjustments and spread spectrum modulation into the final output frequency of the phase-locked loop 500.

The clock divider 506 modifies the output of the voltage-controlled oscillator 514 into a functional signal range between 500 MHz and 1 GHz, for example.

In embodiments, the phase-locked loop 500 uses triangular wave modulation within a spread spectrum strategy to introduce variation around the chosen divider setting. This modulation involves an up-and-down counting pattern (i.e., triangle modulation) that incrementally shifts the feedback signal up and down around the divider setting of the non-integer divider circuit 516.

For example, in an embodiment with a base setting of 4 gigahertz, the phase-locked loop 500 can modulate the output frequency to cause fluctuations between 4.03 gigahertz and 3.97 gigahertz.

When fixed blanking alone is utilized without spread spectrum or dynamic blanking time, the harmonic frequencies can be misplaced. Therefore, the spread spectrum with dynamic blanking time ensures a more even energy distribution across multiple frequencies.

Introducing spread spectrum modulation diffuses the fundamental tone into numerous sub-tones, creating a softened and broadened appearance over frequency. The frequency modulation alone can reduce the electromagnetic emission by 20%. Introducing dynamic blanking time to the spread spectrum modulation flattens the signal even further. The additional dispersion flattens the emission profile and attenuates potential electromagnetic interference by distributing energy over a wider frequency range. The frequency modulation and the dynamic blanking time can reduce the electromagnetic emission by 50%.

Figure 6:
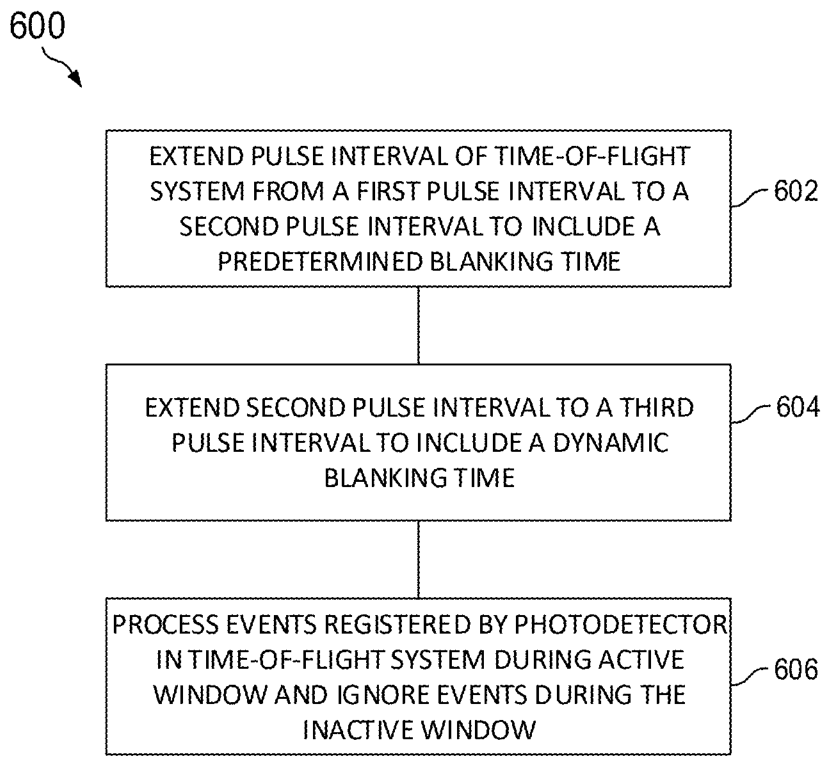
FIG. 6 is a flow chart of an embodiment method to apply fixed and dynamic blanking in a time-of-flight device.

FIG. 6 illustrates a flow chart of an embodiment method to apply fixed and dynamic blanking in a time-of-flight device, such as the system 100, to mitigate target wrap-around issues. It is noted that all steps outlined in the flow chart are not necessarily required and can be optional. Further, changes to the arrangement of the steps, removal of one or more steps and path connections, and addition of steps and path connections are similarly contemplated.

At step 602, the pulse interval (i.e., the interval between pulse emissions by the light source) of the time-of-flight system is extended to include a predetermined blanking time ($T_{BLANK}$). The original pulse interval of the time-of-flight system is determined based on the time interval ($T_{ACTIVE}$) for a light pulse to travel from the light source to a target at the sensor's furthest measurable distance and then return to the photodetector of the time-of-flight system.

At step 604, a dynamic blanking time is added to the extended pulse interval from step 602. The dynamic blanking time for the first pulse in each sequence is set to zero. The dynamic blanking time is extended by an offset for the next pulse in the sequence. For each subsequent pulse in the sequence, the dynamic blanking time is further extended by the offset until a predetermined number of offsets are added to the extended pulse interval. Once the predetermined number of offsets is added, the dynamic blanking time is reset to zero for the next sequence. The cycle repeats for each pulse within the sequence as before.

Each pulse transmitted by the light source propagates through space until it encounters an object. Upon striking the object, the pulse is reflected back toward the time-of-flight system. The photodetectors of the time-of-flight system are positioned to capture this reflected light. When a pulse returns, its arrival is registered as a change in light intensity or a specific photonic signal as long as the returning pulse is within the original time interval ($T_{ACTIVE}$).

At step 606, the pulses within the original time interval are used by the processor of the time-of-flight sensor to measure the time interval between the initial transmission of a pulse and the receipt of the reflected pulse by the photodetectors. This measured time (i.e., time of flight) is used to calculate the distance to the object based on the known speed of light. The pulses arriving outside the original time interval are ignored or registered but not processed.

Figure 7:
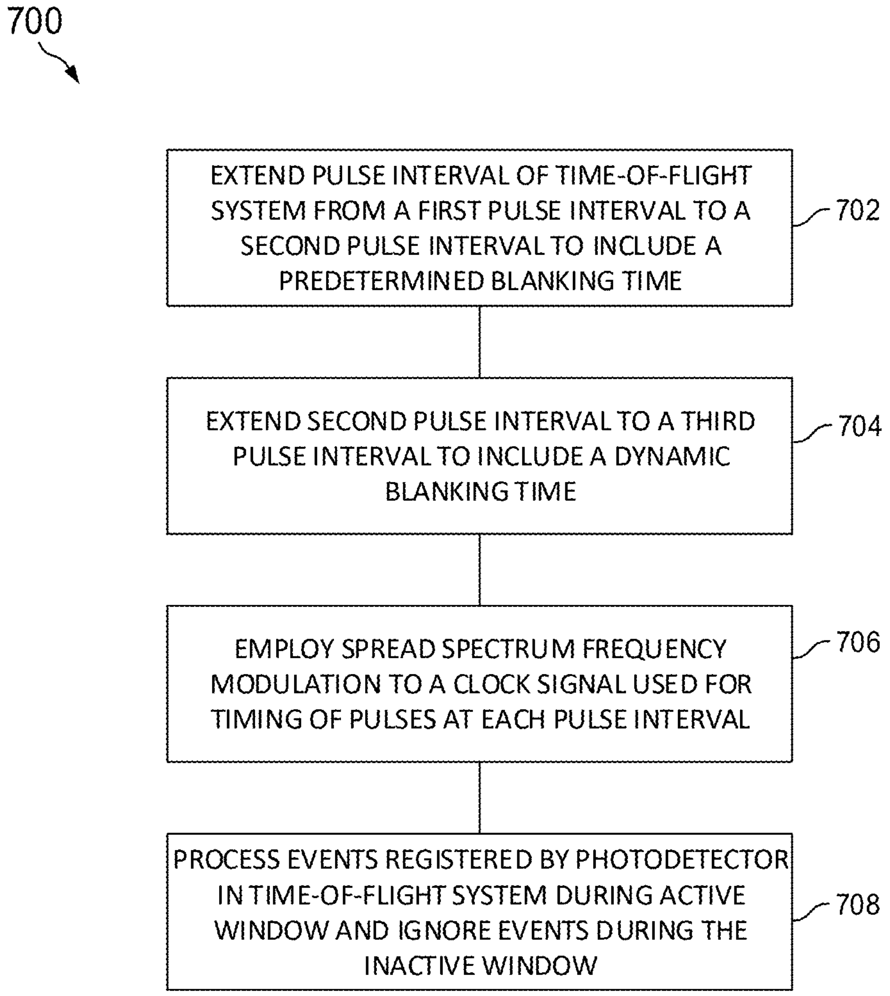
FIG. 7 is a flow chart of an embodiment method for applying fixed and dynamic blanking with spread spectrum modulation in a time-of-flight device.

FIG. 7 illustrates a flow chart of an embodiment method for applying fixed and dynamic blanking with spread spectrum modulation in a time-of-flight device, such as system 100, to reduce electromagnetic emissions. It is noted that all steps outlined in the flow chart are not necessarily required and can be optional. Further, changes to the arrangement of the steps, removal of one or more steps and path connections, and addition of steps and path connections are similarly contemplated.

At step 702, the pulse interval (i.e., the interval between pulse emissions by the light source) of the time-of-flight system is extended to include a predetermined blanking time. The original pulse interval of the time-of-flight system is determined based on the time interval for a light pulse to travel from the light source to a target at the sensor's furthest measurable distance and then return to the photodetector of the time-of-flight system.

At step 704, a dynamic blanking time is added to the extended pulse interval from step 702. The dynamic blanking time for the first pulse in each sequence is set to zero. The dynamic blanking time is extended by an offset for the next pulse in the sequence. For each subsequent pulse in the sequence, the dynamic blanking time is further extended by the offset until a predetermined number of offsets are added to the extended pulse interval. Once the predetermined number of offsets is added, the dynamic blanking time is reset to zero for the next sequence. The cycle repeats for each pulse within the sequence as before.

At step 706, a phase-locked loop of the time-of-flight system synthesizes a clock signal that employs frequency modulation to disperse the tone of electromagnetic emissions across the frequency spectrum. The light source is controlled by a clock that determines the timing of the light pulses being emitted. By spreading the electromagnetic energy of the clock signal over a broader frequency range, the peak magnitude of energy at any particular frequency is reduced. This reduction in peak energy levels minimizes potential electromagnetic interference with other parts of the time-of-flight system or nearby electronic devices. Electromagnetic interference can introduce noise into the time-of-flight system, which might indirectly affect the accuracy and reliability of measurements of electronic components such as photodetectors, which are impacted by this noise.

Each pulse transmitted by the light source propagates through space until it encounters an object. Upon striking the object, the pulse is reflected back toward the time-of-flight system. The photodetectors of the time-of-flight system are positioned to capture this reflected light. When a pulse returns, its arrival is registered as a change in light intensity or a specific photonic signal as long as the returning pulse is within the original time interval.

At step 708, the pulses within the original time interval are used by the processor of the time-of-flight sensor to measure the time interval between the initial transmission of a pulse and the receipt of the reflected pulse by the photodetectors. This measured time (i.e., time of flight) is used to calculate the distance to the object based on the known speed of light. The pulses arriving outside the original time interval are ignored or registered but not processed.

A first aspect relates to a method to mitigate target wraparound in a time-of-flight system. The method includes extending a pulse interval of the time-of-flight system from a first pulse interval to a second pulse interval to include a predetermined blanking time; extending the second pulse interval of the time-of-flight system to a third pulse interval to include a dynamic blanking time, wherein the dynamic blanking time is increased by an offset at each successive pulse, wherein, in response to the dynamic blanking time reaching a predetermined dynamic blanking time, the dynamic blanking time is reset, and wherein the dynamic blanking time is initially set to zero; processing events by the time-of-flight system within an active window to measure a time interval between a transmission of a pulse and receipt of a reflected pulse from an object by the time-of-flight system, a duration of the active window equal to a duration of the first pulse interval; and ignoring events within an inactive window, a duration of the inactive window corresponding to a duration of the third pulse interval minus the duration of the active window.

In a first implementation form of the method according to the first aspect as such, the first pulse interval corresponds to a time interval for a light pulse to travel from a light source of the time-of-flight system to a target at a furthest measurable distance of the time-of-flight system and return to a photodetector of the time-of-flight system.

In a second implementation form of the method according to the first aspect as such or any preceding implementation form of the first aspect, one or more of the predetermined blanking time, the offset, and the predetermined dynamic blanking time are configurable.

In a third implementation form of the method according to the first aspect as such or any preceding implementation form of the first aspect, the events within the inactive window are registered by photodetectors of the time-of-flight system but ignored during the processing.

In a fourth implementation form of the method according to the first aspect as such or any preceding implementation form of the first aspect, the events within the inactive window are not registered by photodetectors of the time-of-flight system.

In a fifth implementation form of the method according to the first aspect as such or any preceding implementation form of the first aspect, the method further includes calculating a distance between a device hosting the time-of-flight system and the object based on the time interval.

In a sixth implementation form of the method according to the first aspect as such or any preceding implementation form of the first aspect, the offset forms a triangular dynamic pattern over time.

A second aspect relates to a method to mitigate electromagnetic emissions in a time-of-flight system. The method comprising extending a pulse interval of the time-of-flight system from a first pulse interval to a second pulse interval to include a predetermined blanking time; extending the second pulse interval of the time-of-flight system to a third pulse interval to include a dynamic blanking time, wherein the dynamic blanking time is increased by an offset at each successive pulse, wherein, in response to the dynamic blanking time reaching a predetermined dynamic blanking time, the dynamic blanking time is reset, and wherein the dynamic blanking time is initially set to zero; employing a spread spectrum frequency modulation to a clock signal used for timing of pulses at each pulse interval; processing events by the time-of-flight system within an active window to measure a time interval between a transmission of a pulse and receipt of a reflected pulse from an object by the time-of-flight system, a duration of the active window equal to a duration of the first pulse interval; and ignoring events within an inactive window, a duration of the inactive window corresponding to a duration of the third pulse interval minus the duration of the active window.

In a first implementation form of the method according to the second aspect as such, the first pulse interval corresponds to a time interval for a light pulse to travel from a light source of the time-of-flight system to a target at a furthest measurable distance of the time-of-flight system and return to a photodetector of the time-of-flight system.

In a second implementation form of the method according to the second aspect as such or any preceding implementation form of the second aspect, employing the spread spectrum frequency modulation comprises spreading a center frequency of the clock signal across a frequency spectrum within a set window.

In a third implementation form of the method according to the second aspect as such or any preceding implementation form of the second aspect, one or more of the predetermined blanking time, the offset, the predetermined dynamic blanking time, and the set window are configurable.

In a fourth implementation form of the method according to the second aspect as such or any preceding implementation form of the second aspect, the events within the inactive window are registered by photodetectors of the time-of-flight system but ignored during the processing.

In a fifth implementation form of the method according to the second aspect as such or any preceding implementation form of the second aspect, the events within the inactive window are not registered by photodetectors of the time-of-flight system.

In a sixth implementation form of the method according to the second aspect as such or any preceding implementation form of the second aspect, the method further includes calculating a distance between a device hosting the time-of-flight system and the object based on the time interval.

A third aspect relates to a time-of-flight system, comprising a non-transitory memory storage comprising instructions; and a processor in communication with the non-transitory memory storage, wherein the instructions, when executed by the processor, cause the time-of-flight system to: extend a pulse interval of the time-of-flight system from a first pulse interval to a second pulse interval to include a predetermined blanking time, extend the second pulse interval of the time-of-flight system to a third pulse interval to include a dynamic blanking time, wherein the dynamic blanking time is increased by an offset at each successive pulse, wherein, in response to the dynamic blanking time reaching a predetermined dynamic blanking time, the dynamic blanking time is reset, and wherein the dynamic blanking time is initially set to zero, employ a spread spectrum frequency modulation to a clock signal used for timing of pulses at each pulse interval, and process events by the time-of-flight system within an active window to measure a time interval between a transmission of a pulse and receipt of a reflected pulse from an object by the time-of-flight system, a duration of the active window equal to a duration of the first pulse interval, wherein events within an inactive window are ignored, a duration of the inactive window corresponding to a duration of the third pulse interval minus the duration of the active window.

In a first implementation form of the time-of-flight system according to the third aspect as such, the first pulse interval corresponds to a time interval for a light pulse to travel from a light source of the time-of-flight system to a target at a furthest measurable distance of the time-of-flight system and return to a photodetector of the time-of-flight system.

In a second implementation form of the time-of-flight system according to the third aspect as such or any preceding implementation form of the third aspect, employing the spread spectrum frequency modulation comprises spreading a center frequency of the clock signal across a frequency spectrum within a set window.

In a third implementation form of the time-of-flight system according to the third aspect as such or any preceding implementation form of the third aspect, one or more of the predetermined blanking time, the offset, the predetermined dynamic blanking time, and the set window are configurable.

In a fourth implementation form of the time-of-flight system according to the third aspect as such or any preceding implementation form of the third aspect, the events within the inactive window are registered by photodetectors of the time-of-flight system but ignored during the processing.

In a fifth implementation form of the time-of-flight system according to the third aspect as such or any preceding implementation form of the third aspect, the events within the inactive window are not registered by photodetectors of the time-of-flight system.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method to mitigate target wraparound in a time-of-flight system, the method comprising:

extending a pulse interval of the time-of-flight system from a first pulse interval to a second pulse interval to include a predetermined blanking time;

extending the second pulse interval of the time-of-flight system to a third pulse interval to include a dynamic blanking time, wherein the dynamic blanking time is increased by an offset at each successive pulse, wherein, in response to the dynamic blanking time reaching a predetermined dynamic blanking time, the dynamic blanking time is reset, and wherein the dynamic blanking time is initially set to zero;

processing events by the time-of-flight system within an active window to measure a time interval between a transmission of a pulse and receipt of a reflected pulse from an object by the time-of-flight system, a duration of the active window equal to a duration of the first pulse interval; and ignoring events within an inactive window, a duration of the inactive window corresponding to a duration of the third pulse interval minus the duration of the active window.

2. The method of claim 1, wherein the first pulse interval corresponds to a time interval for a light pulse to travel from a light source of the time-of-flight system to a target at a furthest measurable distance of the time-of-flight system and return to a photodetector of the time-of-flight system.

3. The method of claim 1, wherein one or more of the predetermined blanking time, the offset, and the predetermined dynamic blanking time are configurable.

4. The method of claim 1, wherein the events within the inactive window are registered by photodetectors of the time-of-flight system but ignored during the processing.

5. The method of claim 1, wherein the events within the inactive window are not registered by photodetectors of the time-of-flight system.

6. The method of claim 1, further comprising calculating a distance between a device hosting the time-of-flight system and the object based on the time interval.

7. The method of claim 1, wherein the offset forms a triangular dynamic pattern over time.

8. A method to mitigate electromagnetic emissions in a time-of-flight system, the method comprising:

extending a pulse interval of the time-of-flight system from a first pulse interval to a second pulse interval to include a predetermined blanking time;

extending the second pulse interval of the time-of-flight system to a third pulse interval to include a dynamic blanking time, wherein the dynamic blanking time is increased by an offset at each successive pulse, wherein, in response to the dynamic blanking time reaching a predetermined dynamic blanking time, the dynamic blanking time is reset, and wherein the dynamic blanking time is initially set to zero;

employing a spread spectrum frequency modulation to a clock signal used for timing of pulses at each pulse interval;

processing events by the time-of-flight system within an active window to measure a time interval between a transmission of a pulse and receipt of a reflected pulse from an object by the time-of-flight system, a duration of the active window equal to a duration of the first pulse interval; and ignoring events within an inactive window, a duration of the inactive window corresponding to a duration of the third pulse interval minus the duration of the active window.

9. The method of claim 8, wherein the first pulse interval corresponds to a time interval for a light pulse to travel from a light source of the time-of-flight system to a target at a furthest measurable distance of the time-of-flight system and return to a photodetector of the time-of-flight system.

10. The method of claim 8, wherein employing the spread spectrum frequency modulation comprises spreading a center frequency of the clock signal across a frequency spectrum within a set window.

11. The method of claim 10, wherein one or more of the predetermined blanking time, the offset, the predetermined dynamic blanking time, and the set window are configurable.

12. The method of claim 8, wherein the events within the inactive window are registered by photodetectors of the time-of-flight system but ignored during the processing.

13. The method of claim 8, wherein the events within the inactive window are not registered by photodetectors of the time-of-flight system.

14. The method of claim 8, further comprising calculating a distance between a device hosting the time-of-flight system and the object based on the time interval.

15. A time-of-flight system, comprising:

a non-transitory memory storage comprising instructions; and a processor in communication with the non-transitory memory storage, wherein the instructions, when executed by the processor, cause the time-of-flight system to:

extend a pulse interval of the time-of-flight system from a first pulse interval to a second pulse interval to include a predetermined blanking time, extend the second pulse interval of the time-of-flight system to a third pulse interval to include a dynamic blanking time, wherein the dynamic blanking time is increased by an offset at each successive pulse, wherein, in response to the dynamic blanking time reaching a predetermined dynamic blanking time, the dynamic blanking time is reset, and wherein the dynamic blanking time is initially set to zero, employ a spread spectrum frequency modulation to a clock signal used for timing of pulses at each pulse interval, and process events by the time-of-flight system within an active window to measure a time interval between a transmission of a pulse and receipt of a reflected pulse from an object by the time-of-flight system, a duration of the active window equal to a duration of the first pulse interval, wherein events within an inactive window are ignored, a duration of the inactive window corresponding to a duration of the third pulse interval minus the duration of the active window.

16. The time-of-flight system of claim 15, wherein the first pulse interval corresponds to a time interval for a light pulse to travel from a light source of the time-of-flight system to a target at a furthest measurable distance of the time-of-flight system and return to a photodetector of the time-of-flight system.

17. The time-of-flight system of claim 15, wherein employing the spread spectrum frequency modulation comprises spreading a center frequency of the clock signal across a frequency spectrum within a set window.

18. The time-of-flight system of claim 17, wherein one or more of the predetermined blanking time, the offset, the predetermined dynamic blanking time, and the set window are configurable.

19. The time-of-flight system of claim 15, wherein the events within the inactive window are registered by photodetectors of the time-of-flight system but ignored during the processing.

20. The time-of-flight system of claim 15, wherein the events within the inactive window are not registered by photodetectors of the time-of-flight system.

* * * * *